US007406182B2

(12) United States Patent
Ono

(10) Patent No.: US 7,406,182 B2
(45) Date of Patent: Jul. 29, 2008

(54) IMAGE CAPTURING APPARATUS, IMAGE CAPTURING METHOD, AND MACHINE READABLE MEDIUM STORING THEREON IMAGE CAPTURING PROGRAM

(75) Inventor: Shuji Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 666 days.

(21) Appl. No.: 11/093,299

(22) Filed: Mar. 30, 2005

(65) Prior Publication Data

US 2005/0232468 A1 Oct. 20, 2005

(30) Foreign Application Priority Data

Mar. 31, 2004 (JP) ............... 2004-106047

(51) Int. Cl.
G06K 9/00 (2006.01)
G06K 9/40 (2006.01)
G06K 9/32 (2006.01)
H04N 9/47 (2006.01)

(52) U.S. Cl. ................ 382/104; 382/255; 382/298; 348/148

(58) Field of Classification Search ........... 382/104, 382/106, 255, 275, 298; 348/142, 148, 149
See application file for complete search history.

(56) References Cited

U.S. PATENT DOCUMENTS 5,892,855 A * 4/1999 Kakinami et al. ........... 382/291
5,987,174 A * 11/1999 Nakamura et al. .......... 382/199
6,731,777 B1 * 5/2004 Nishigaki et al. ........... 382/106
6,888,953 B2 * 5/2005 Hanawa .................... 382/104
6,993,159 B1 * 1/2006 Ishii et al. .................. 382/104
7,042,389 B2 * 5/2006 Shirai ........................ 342/70
7,095,001 B2 * 8/2006 Kawahara ................ 250/201.2

FOREIGN PATENT DOCUMENTS

JP 8-161698 A 6/1996

* cited by examiner

Primary Examiner—Colin LaRose
(74) Attorney, Agent, or Firm—Birch, Stewart, Kolasch, & Birch, LLP

(57) ABSTRACT

An image capturing apparatus provided to a movable body for capturing a clear image without blurring even if it is the case where it is moving. The image capturing apparatus includes: an image capturing unit which captures an image; a speed measurement unit which measures a speed of the movable body; a displacement calculating unit which calculates a displacement of a region indicating a subject which exists in an angle-of-view of the image capturing unit in an image captured by the image capturing unit based on the speed during an exposure time of the image capturing unit; a capturing magnification rate-of-change calculating unit which calculates a rate-of-change of a capturing magnification of the image capturing unit, wherein the capturing magnification rate-of-change calculating unit compensates the displacement; a capturing magnification control unit which controls the capturing magnification in order to change it by the rate-of-change; and a capturing timing control unit which makes the image capturing unit capture an image while the capturing magnification changing by the rate-of-change.

16 Claims, 8 Drawing Sheets

IMAGE CAPTURING APPARATUS, IMAGE CAPTURING METHOD, AND MACHINE READABLE MEDIUM STORING THEREON IMAGE CAPTURING PROGRAM

This patent application claims priority from a Japanese patent application No. 2004-106047 filed on Mar. 31, 2004, the contents of which are incorporated herein by reference.

BACKGROUND OF THE INVENTION

1. Field of the Invention

The present invention relates to an image capturing apparatus, an image capturing method, and a machine readable medium storing thereon an image capturing program. More particularly, the present invention relates to an image capturing apparatus mounted with a vehicle, an image capturing method for the image capturing apparatus, and a machine readable medium storing thereon an image capturing program, which cause the image capturing apparatus to be functioned.

2. Description of Related Art

Conventionally, an in-vehicle camera is known which is mounted with a vehicle, such as a car, and captures the image around a vehicle (cf. Japanese Patent Laid Open No. 8-161698). An image captured by such an in-vehicle camera is used to enhance driving safety by recognizing an object which exists near the vehicle from the image and by notifying a motor driver or the like for the recognition result, as well as the image is displayed to the motor driver.

However, when the vehicle moves during exposure time, only an indistinct image which has blurring in the subject image can be captured. Consequently, the driver has had trouble seeing the image in the conventional in-vehicle camera. Moreover, when the object which exists around the vehicle is to be recognized using such an indistinct image, the recognition rate was low and it could not enhance the driving safety sufficiently enough.

SUMMARY OF THE INVENTION

Therefore, it is an object of the present invention to provide an image capturing apparatus, an image capturing method, and a machine readable medium storing thereon an image capturing program which can solve the foregoing problems. The above and other objects can be achieved by combinations described in the independent claims. The dependent claims define further advantageous and exemplary combinations of the present invention.

According to a first aspect of the present invention, there is provided an image capturing apparatus provided to a movable body. The image capturing apparatus includes: an image capturing unit which captures an image; a speed measurement unit which measures a speed of the movable body; a displacement calculating unit which calculates a displacement of a region indicating a subject which exists in an angle-of-view of the image capturing unit in an image captured by the image capturing unit based on the speed during an exposure time of the image capturing unit; a capturing magnification rate-of-change calculating unit which calculates a rate-of-change of a capturing magnification of the image capturing unit, wherein the capturing magnification rate-of-change calculating unit compensates the displacement; a capturing magnification control unit which controls the capturing magnification in order to change it by the rate-of-change; and a capturing timing control unit which makes the image capturing unit capture an image while the capturing magnification changing by the rate-of-change.

The image capturing apparatus may further include a distance receiving unit which receives a distance from the movable body to the subject, wherein the displacement calculating unit may calculate a displacement of a region indicating the subject in an image captured by the image capturing unit during an exposure time of the image capturing unit further based on the distance.

The capturing magnification control unit may fluctuate the capturing magnification by a frequency of an integral multiple of a frame rate of a captured image, and the capturing timing control unit may make the image capturing unit capture an image by a phase in which the capturing magnification fluctuates by the rate-of-change.

The movable body may be a vehicle.

The image capturing apparatus may further include a steering angle measurement unit which measures a steering angle of the vehicle, wherein the displacement calculating unit may calculate a displacement of a region indicating the subject in an image captured by the image capturing unit during an exposure time of the image capturing unit further based on the steering angle.

The image capturing apparatus may further include: a steering angle measurement unit which measures a steering angle of the vehicle; and a capturing directional control unit which controls a capturing direction of the image capturing unit based on the steering angle so that a vanishing point in an image captured by the image capturing unit may be aligned with an optical center of the image capturing unit.

The image capturing unit may include: an optical system which focuses an optical image of the subject; and a CCD in which a center of a region for capturing is provided so that it may be located below an optical axis of the optical system.

The image capturing unit may capture a plurality of images, the displacement calculating unit may calculate the displacement of a region indicating a subject which exists in an angle-of-view of the image capturing unit in the image capturing unit during an exposure time of the image capturing unit for each of the plurality of images captured by the image capturing unit based on the measured speed, the capturing magnification rate-of-change calculating unit may calculate the rate-of-change of the capturing magnification of the image capturing unit, which compensates the calculated displacement in the image for each of the plurality of images captured by the image capturing unit, the capturing magnification control unit may control the capturing magnification in order to change it by the rate-of-change calculated in the image for each of the plurality of images captured by the image capturing unit, the capturing timing control unit may make the image capturing unit capture the image while the capturing magnification changing by the rate-of-change calculated in the image for each of the plurality of images captured by the image capturing unit, and the image capturing apparatus may include an image processing unit which composes the plurality of images captured by the image capturing unit, and generates an image having higher resolution than the plurality of images captured by the image capturing unit.

The displacement calculating unit may calculates the displacement of a region indicating subjects being different with each other for at least some images among the plurality of images captured by the image capturing unit.

The image processing unit may compose each image of a region where displacement has been calculated by the displacement calculating unit in each of the plurality of images captured by the image capturing unit.

According to a second aspect of the present invention, there is provided an image capturing method for an image capturing apparatus provided to a movable body. The image capturing method includes: an image capturing step of capturing an image by a capturing unit provided to the image capturing apparatus; a speed measurement step of measuring a speed of the movable body; a displacement calculating step of calculating a displacement of a region indicating a subject which exists in an angle-of-view of the image capturing unit in an image captured in the image capturing step based on the speed during an exposure time of the image capturing step; a capturing magnification rate-of-change calculating step of calculating a rate-of-change of a capturing magnification in the image capturing step, wherein the displacement is compensated in the capturing magnification rate-of-change calculating step; a capturing magnification control step of controlling the capturing magnification in order to change it by the rate-of-change; and a capturing timing control step of making the image capturing unit capture an image while the capturing magnification changing by the rate-of-change.

According to a third aspect of the present invention, there is provided a machine readable medium having an image capturing program stored thereon, which when executed by a machine causes an image capturing apparatus provided to a movable body to act as an image capturing apparatus, including: an image capturing unit which captures an image; a speed measurement unit which measures a speed of the movable body; a displacement calculating unit which calculates a displacement of a region indicating a subject which exists in an angle-of-view of the image capturing unit in an image captured by the image capturing unit based on the speed during an exposure time of the image capturing unit; a capturing magnification rate-of-change calculating unit which calculates a rate-of-change of a capturing magnification of the image capturing unit, wherein the capturing magnification rate-of-change calculating unit compensates the displacement; a capturing magnification control unit which controls the capturing magnification in order to change it by the rate-of-change; and a capturing timing control unit which makes the image capturing unit capture an image while the capturing magnification changing by the rate-of-change.

According to a fourth aspect of the present invention, there is provided an image recognition system. The image recognition system includes: an image capturing unit which captures an image; a speed measurement unit which measures a speed of the movable body; a displacement calculating unit which calculates a displacement of a region indicating a subject which exists in an angle-of-view of the image capturing unit in an image captured by the image capturing unit based on the speed during an exposure time of the image capturing unit; a capturing magnification rate-of-change calculating unit which calculates a rate-of-change of a capturing magnification of the image capturing unit, wherein the capturing magnification rate-of-change calculating unit compensates the displacement; a capturing magnification control unit which controls the capturing magnification in order to change it by the rate-of-change; a capturing timing control unit which makes the image capturing unit capture an image while the capturing magnification changing by the rate-of-change; and an image recognition unit which recognizes the subject in the image, which is captured by the image capturing unit under control of the capturing timing control unit.

The movable body may be a vehicle, and the image recognition system may further include a vehicle control unit which controls a speed and a steering angle of the vehicle based on the subject recognized by the image recognition unit.

According to a fifth aspect of the present invention, there is provided an image recognition method. The image recognition method includes: an image capturing step of capturing an image by a capturing unit provided to the image capturing apparatus; a speed measurement step of measuring a speed of the movable body; a displacement calculating step of calculating a displacement of a region indicating a subject which exists in an angle-of-view of the image capturing unit in an image captured in the image capturing step based on the speed during an exposure time of the image capturing step; a capturing magnification rate-of-change calculating step of calculating a rate-of-change of a capturing magnification in the image capturing step, wherein the displacement is compensated in the capturing magnification rate-of-change calculating step; a capturing magnification control step of controlling the capturing magnification in order to change it by the rate-of-change; a capturing timing control step of making the image capturing unit capture an image while the capturing magnification changing by the rate-of-change; and an image recognition step of recognizing the subject in the image captured by the image capturing unit under control of the capturing timing control step.

According to a sixth aspect of the present invention, there is provided a machine readable medium having an image recognition program stored thereon, which when executed by a machine causes a machine to act as an image recognition system, including: an image capturing unit which captures an image; a speed measurement unit which measures a speed of the movable body; a displacement calculating unit which calculates a displacement of a region indicating a subject which exists in an angle-of-view of the image capturing unit in an image captured by the image capturing unit based on the speed during an exposure time of the image capturing unit; a capturing magnification rate-of-change calculating unit which calculates a rate-of-change of a capturing magnification of the image capturing unit, wherein the capturing magnification rate-of-change calculating unit compensates the displacement; a capturing magnification control unit which controls the capturing magnification in order to change it by the rate-of-change; a capturing timing control unit which makes the image capturing unit capture an image while the capturing magnification changing by the rate-of-change; and an image recognition unit which recognizes the subject in the image, which is captured by the image capturing unit under control of the capturing timing control unit.

The summary of the invention does not necessarily describe all necessary features of the present invention. The present invention may also be a sub-combination of the features described above.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
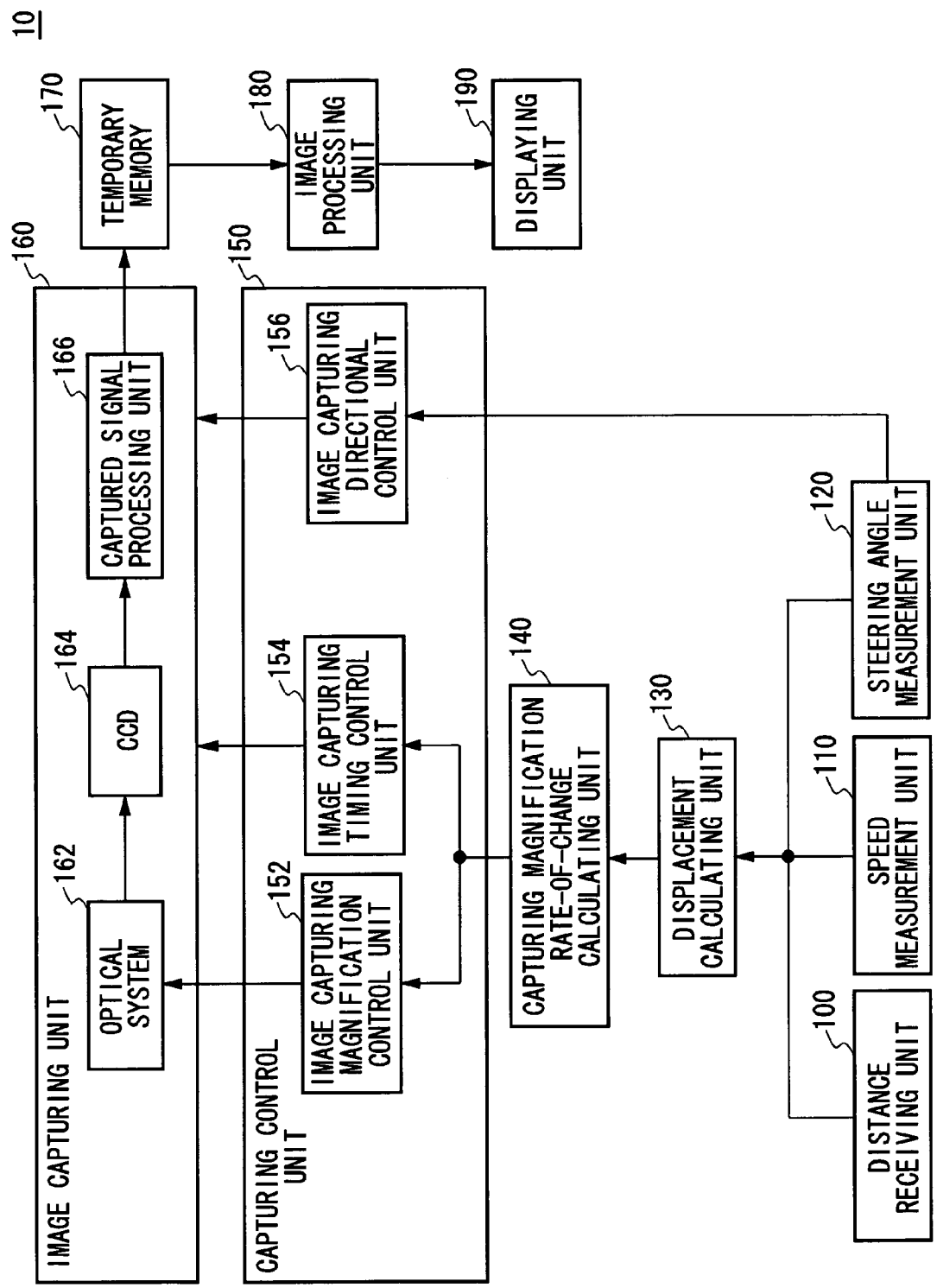
FIG. 1 is a block diagram exemplary showing a configuration of an image capturing apparatus according to a first embodiment of the present invention.

FIG. 1 is a block diagram exemplary showing a configuration of an image capturing apparatus 10 according to a first embodiment of the present invention. The image capturing apparatus 10 is so-called in-vehicle camera equipped in a vehicle, such as an automobile, so that it may capture an image around the vehicle. The image around the vehicle captured by the image capturing apparatus 10 is provided for the driver or the like, and may be used for recognition of the object which exists around the vehicle. In this case, the information on the object which exists around the vehicle recognized based on the image captured by the image capturing apparatus 10 is used for improvement of the driving safety by providing the driver or the like with warning when there is a person near the vehicle, for example.

Here, it is preferable that the image captured by the image capturing apparatus 10 is a clear image so that it may be easy to see for the driver or the like and the recognition of the subject may be performed with a high recognition rate. However, when the vehicle with which the image capturing apparatus 10 is mounted is moving, optical image of the subject approaching to the image capturing apparatus 10 changes during the exposure time of the image capturing apparatus. Consequently blurring occurs in the captured image and it is difficult to obtain a clear image. Therefore, it is an object of the image capturing apparatus 10 according to the present embodiment to capture a clear image without blurring by controlling image capturing magnification to compensate the blurring of the subject image even if the vehicle is moving.

The image capturing apparatus 10 includes a distance receiving unit 100, a speed measurement unit 110, a steering angle measurement unit 120, a displacement calculating unit 130, a capturing magnification rate-of-change calculating unit 140, a capturing control unit 150, an image capturing unit 160, a temporary memory 170, an image processing unit 180, and a displaying unit 190. The image capturing unit 160 captures an image around the vehicle. For example, the image capturing unit 160 is oriented so that the optical axis is oriented ahead of the vehicle, and captures the image ahead of the vehicle. Here, the image capturing unit 160 may capture a still image, or may capture video. The image capturing unit 160 includes an optical system 162, a CCD 164, and a captured signal processing unit 166. The optical system 162 focuses optical image of the subject on photo detecting surface of the CCD 164. The CCD 164 includes a plurality of photo detectors which output electric charges, which are accumulated in each of the photo detectors by an optical image of the subject focused by the optical system 162, to the captured signal processing unit 166 as an analog electrical signal. The captured signal processing unit 166 resolves the analog electrical signal of the subject image received from the CCD 164 into R, G, and B components. Then, the captured signal processing unit 166 performs A/D conversion of the analog electrical signal resolved into R, G, and B components, and outputs digital image data of the subject image to the temporary memory 170. The temporary memory 170 is volatile memory, such as DRAM, and stores the image data output from the captured signal processing unit 166.

The distance receiving unit 100 receives distance from the vehicle to the subject which exists in the angle-of-view of the image capturing unit 160, and outputs the received distance to the displacement calculation unit 130. The speed measurement unit 110 measures speed of the vehicle, and outputs the measured speed to the displacement calculation unit 130. The steering angle measurement unit 120 measures the steering angle of the vehicle, and outputs the measured steering angle to the displacement calculation unit 130 and the image capturing control unit 150. The calculation unit 130 calculates displacement of the region indicating the subject in the image captured by the image capturing unit 160 during the exposure time of the image capturing unit 160 based on the distance from the vehicle to the subject received by the distance receiving unit 100 and the speed of the vehicle measured by the speed measurement unit 110. Moreover, the displacement calculation unit 130 may calculate the displacement of the region indicating the subject further based on the steering angle of the vehicle measured by the steering angle measurement unit 120. Then, the displacement calculation unit 130 outputs the calculated displacement of the region indicating the subject to the image capturing magnification rate-of-change calculation unit 140.

The image capturing magnification rate-of-change calculation unit 140 calculates rate-of-change of the image capturing magnification of the image capturing unit 160 which compensates the displacement in the region, which indicates the subject in the image captured by the image capturing unit 160 during the exposure time, calculated by the displacement calculation unit 130. Then, the image capturing magnification rate-of-change calculation unit 140 outputs the rate-of-change of the calculated image capturing magnification to the image capturing control unit 150. The image capturing control unit 150 includes an image capturing magnification control unit 152, an image capturing timing control unit 154, and an image capturing directional control unit 156, and controls operation of the image capturing unit 160 by controlling the components in the image capturing unit 160. The image capturing magnification control unit 152 controls the image capturing magnification of the image capturing unit 160 in order to change it by the rate-of-change calculated by the image capturing magnification rate-of-change calculation unit 140. For example, the image capturing magnification control unit 152 may change the image capturing magnification of the image capturing unit 160 by driving an actuator in the image capturing unit 160 so that it may control a zoom lens in the optical system 162. The image capturing timing control unit 154 makes the image capturing unit 160 capture an image while the image capturing magnification of the image capturing unit 160 being controlled by the image capturing magnification control unit 152 by the rate-of-change calculated by the image capturing magnification rate-of-change calculation unit 140. The image capturing directional control unit 156 receives the steering angle of the vehicle from the steering angle measurement unit 120. Then, the image capturing directional control unit 156 controls the image capturing direction of the image capturing unit 160 based on the received steering angle so that a vanishing point in the image captured by the image capturing unit 160 may substantially align with an optical center of the image capturing unit 160. Here, the image capturing directional control unit 156 may control the image capturing direction of the image capturing unit 160 by controlling a universal head on which the image capturing unit 160 is mounted.

The image processing unit 180 performs image processing to the image data captured by the image capturing unit 160 and stored on the temporary memory 170. Here, the image processing may be conversion to a video signal such as NTSC or PAL. Then, the image processing unit 180 outputs the processed image data to the displaying unit 190. The displaying unit 190 includes a display unit, such as, for example, an LCD panel displays, and displays the image data received from the image-processing unit 180 for the driver or the like.

According to the image capturing apparatus 10 of the present embodiment, even if it is the case where the position of the region, which indicates the subject in the captured image, changes due to the travel of the vehicle during the exposure time, a clear image of the subject without blurring can be captured by changing the image capturing magnification to compensate the change of the position of the region indicating the subject.

Moreover, according to the image capturing apparatus 10 of the present embodiment, even if it is the case where the vehicle is not traveling straight on, the same image as the image when the vehicle is traveling straight on may be captured by controlling the image capturing direction of the image so that the vanishing point may substantially align with the optical center. Thereby, even if it is the case where the vehicle is not going straight on, the displacement of the region indicating the subject is easily calculable.

In addition, the image capturing directional control unit 156 may calculate the vanishing point in the image to capture the image based on the position where the image capturing unit 160 is installed, the image capturing direction of the image capturing unit 160, and the traveling direction of the vehicle. Alternatively, the image capturing directional control unit 156 may calculate the vanishing point in the image to capture the image as an intersection of a plurality of calculated optical flows while calculating the optical flows based on the change of position of the subject in the plurality of images which are captured in advance. In addition, when the vehicle is not going straight on, the image capturing apparatus 10 may perform only either of processing of calculating the displacement of the region indicating the subject in the image to be captured based on the steering angle of the vehicle, or processing of controlling the image capturing direction of the image based on the steering angle of the vehicle.

In addition, the configuration of the image capturing apparatus 10 according to the present embodiment is not limited to the configuration shown in the drawings, but may have various change to the configuration shown in the drawings. For example, the image capturing apparatus 10 may omit the distance receiving unit 100. In this case, the displacement calculation unit 130 may calculate the displacement of the region indicating the subject during the exposure time of the image capturing unit 160 by using a predetermined value as the distance from the vehicle to the subject. Here, the predetermined value may be an approximate value of the distance from the vehicle to the subject when the driver pays attention to the subject which is desired to be imaged without blurring, such as a traffic sign painted on the road surface, a traffic signal, and a person who has run out to the road. Alternatively, it may be an approximate value corrected in proportion to the speed of the vehicle. Thereby, without measuring the distance from the vehicle to the subject, the displacement of the region indicating the subject during the exposure time can be compensated, and a clear image without blurring can be captured. Therefore, since the image capturing apparatus 10 can be configured without an apparatus for measuring the distance from the vehicle to the subject, such as a focusing sensor or a range finder, manufacturing cost of the image capturing apparatus 10 can be reduced.

Figure 2A:
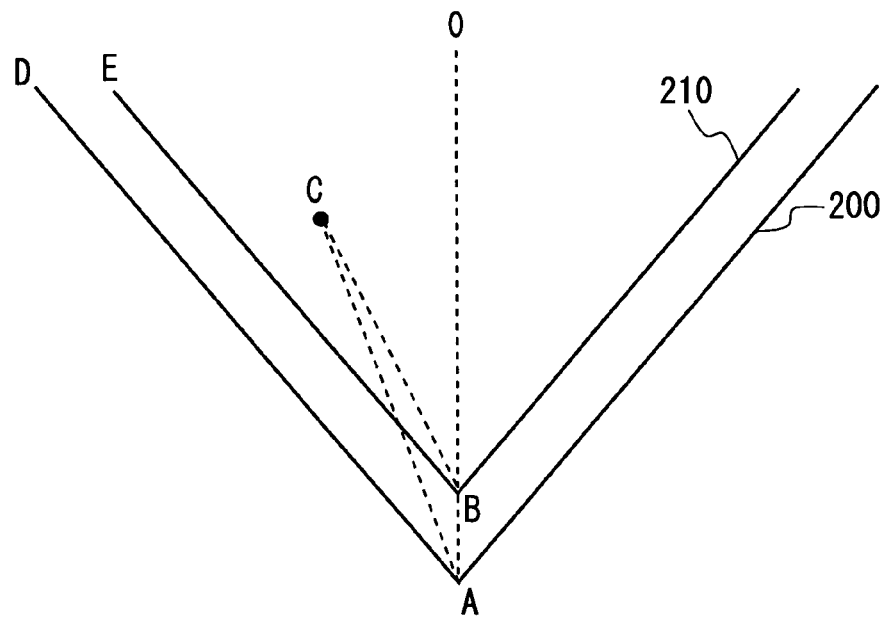
FIGS. 2A and 2B are drawings exemplary showing processing in a capturing magnification rate-of-change computing unit according to the first embodiment of the present invention.
Figure 2B:
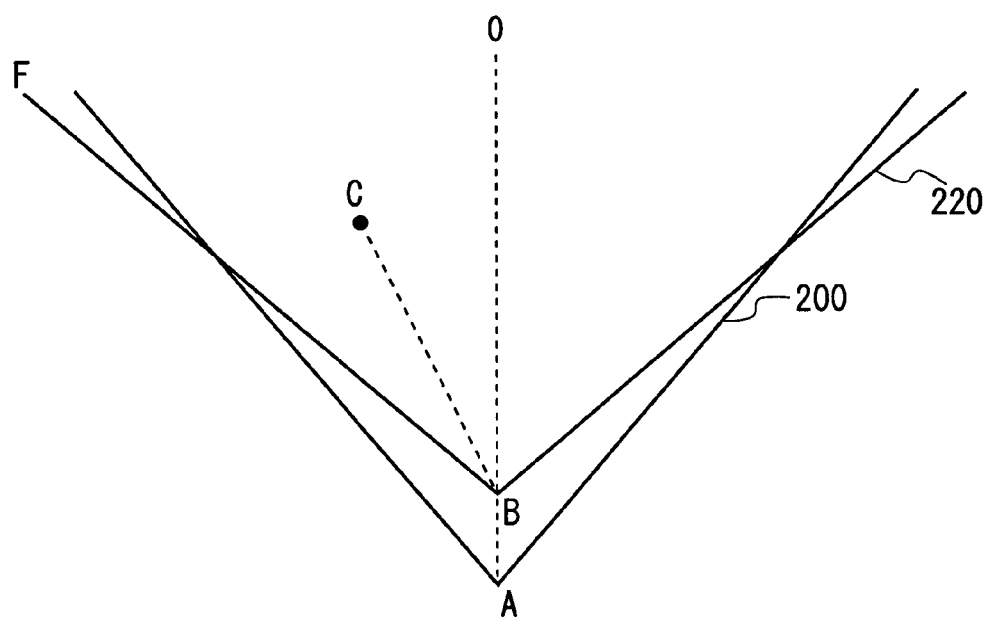

FIGS. 2A and 2B show an example of processing of the image capturing magnification rate-of-change calculation unit 140 according to a first embodiment of the present invention. In the drawings, it will be explained in detail that the image capturing apparatus 10 captures a clear image without blurring by controlling the image capturing magnification of the image capturing unit 160. FIG. 2A shows an example of change of angle-of-view in the image capturing unit 160 at the time of looking down the vehicle from above. In this example, the image capturing unit 160 is provided so that it may capture the image of front of the vehicle, and a dotted line AO also shows the optical axis of the image capturing unit 160 as well as the traveling direction of the vehicle. First, suppose that the vehicle, on which the image capturing apparatus 10 is provided, exists at "A". Here, the angle-of-view of the image capturing unit 160 at "A" is shown by an angle-of-view 200. Then, suppose that the vehicle moves from A to B. Here, when the image capturing magnification does not change with the change of the position of the vehicle, the angle-of-view of the image capturing unit 160 at "B" is shown by an angle-of-view 210.

Then, the subject at "C" within the angle-of-view "A" and "B" of the image capturing unit 160 will be described. In addition, in this example, to simplify the explanation, although the subject which exists at "C" exists on the same horizontal plane as the optical axis of the image capturing apparatus 10, in actual operation of the image capturing apparatus 10, "C" may exists at any position. In the drawing, when the vehicle exists at "A", the angle made by the direction from "A" to "C" and the optical axis AO is a half of the angle made by the optical axis AO and the left end of the angle-of-view AD. That is, in the image captured at "A", the centroid of the region indicating the subject which exists at "C" is located in the middle of the optical center and the left end of the image. On the other hand, when the vehicle exists at "B", the angle made by the direction from "B" to "C" and the optical axis BO is not a half of the angle made by the optical axis BO and the left end of the angle-of-view BE. Therefore, the centroid position of the region indicating the subject which exists at "C" in the image captured at "B" is different from the centroid position in the image captured at "A". For this reason, as for the images captured by the image capturing unit 160, when the vehicle moves from "A" to "B" during the exposure time, blurring occurs in the images indicating the subject which exists at FIG. 2B shows another example of change of the angle-of-view in the image capturing unit 160 at the time of looking down the vehicle from above. In the drawing, the image capturing apparatus 10 defines the angle-of-view of the image capturing unit 160 at "B" as an angle-of-view 220, which is different from the angle-of-view 200. Then, when the vehicle exists at "B", the angle made by the direction from "B" to "C" and the optical axis BO is a half of the angle made by the optical axis BO and the left end of the angle-of-view AF. That is, in the image captured at "B", the centroid of the region indicating the subject which exists at "C" is located in the middle of the optical center and the left end of the image, and regardless where the vehicle exists at "A" or "B", the centroid position of the region, which indicates the subject which exists at "C" in the captured images, does not change. Therefore, when the image capturing apparatus 10 captures an image at a timing when the vehicle moves from "A" to "B" during the exposure time, the image capturing magnification control unit 152 changes the image capturing magnification of the image capturing unit 160 one by one during the exposure time so that the angle-of-view at A may be the angle-of-view 200 and the angle-of-view at B may be the angle-of-view 220. Thereby, the image capturing apparatus 10 can capture the clear image without blurring in the image of the subject which exists at "C".

Figure 3:
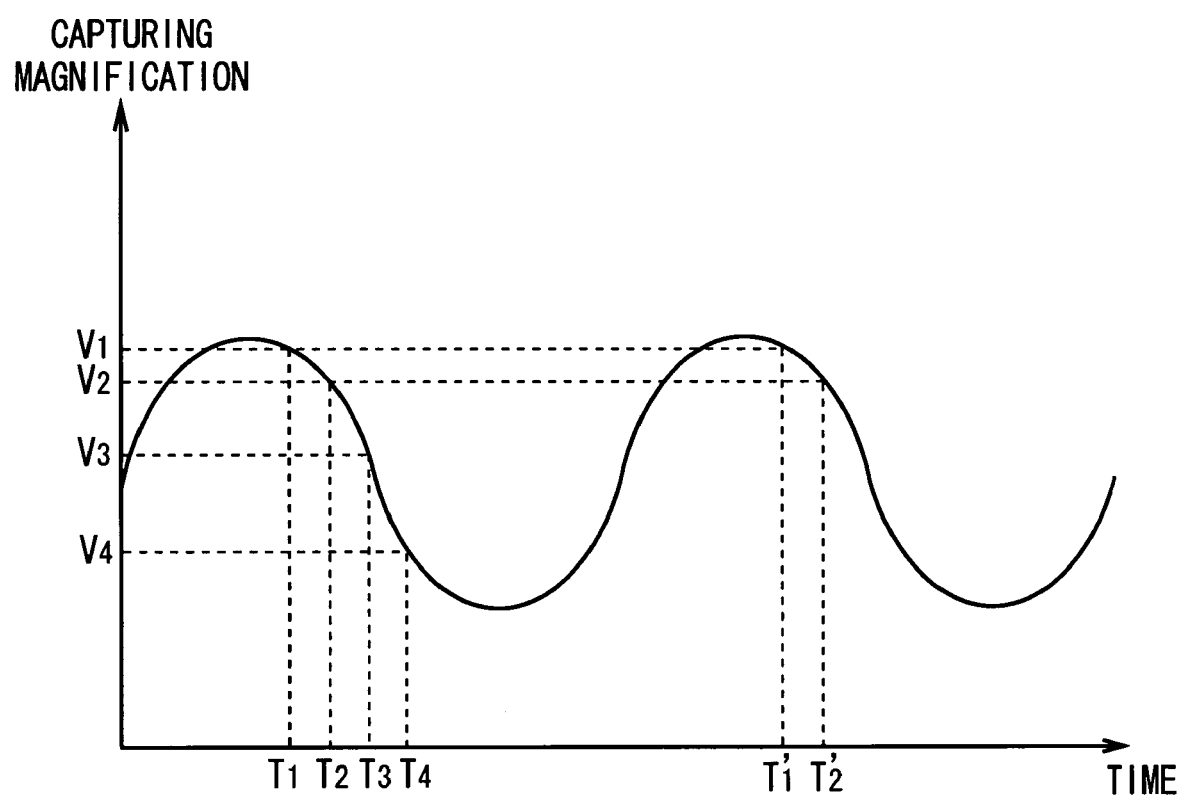
FIG. 3 is a drawing exemplary showing processing in a capturing control unit according to the first embodiment of the present invention.

FIG. 3 shows an example of processing of the image capturing control unit 150 according to the first embodiment of the present invention. The image capturing magnification control unit 152 controls the image capturing magnification of the image capturing unit 160 so that it may compensate the change of the position of the subject image during the exposure time. Here, when the image capturing is not performed, the image capturing magnification of the image capturing unit 160 is constant, and when the image capturing is to be performed, the image capturing magnification control unit 152 makes an actuator in the image capturing unit 160 drive to change the image capturing magnification, and while image capturing magnification changing by the rate-of-change calculated by the image capturing magnification rate-of-change calculation unit 140, the image capturing timing control unit 154 may make the image capturing unit 160 capture the image. Alternatively, when the image capturing magnification control unit 152 continuously changes the image capturing magnification by the rate-of-change and when the image capturing magnification of the image capturing unit 160 is changing by the rate calculated by the image capturing magnification rate-of-change calculation unit 140, the image capturing timing control unit 154 may make the image to be captured by the image capturing unit 160.

In the drawing, processing of the capturing control unit 150 when capturing magnification is continuously changing like the latter case will be described. Such a control method of the capturing magnification functions more effectively when the image capturing apparatus 10 captures images periodically, e.g., a dynamic image. Therefore, to describe with reference to the drawing, a case where the image capturing apparatus 10 captures a dynamic image will be described as an example.

In the drawing, a horizontal axis shows time and a vertical axis shows the capturing magnification of the image capturing unit 160. The capturing magnification control unit 152 makes the capturing magnification of the image capturing unit 160 fluctuate by a frequency of integral multiple of the frame rate of the image to be captured. For example, the capturing magnification control unit 152 makes the magnification of the image capturing unit 160 fluctuate so that it has a sinusoidal wave form of which the period is 1/30 second. Here, the capturing timing control unit 154 makes the image capturing unit 160 captures the image by a phase where the capturing magnification of the image capturing unit 160 changes by the rate-of-change calculated by the capturing magnification rate-of-change calculating unit 140. For example, when the calculated rate-of-change per unit time is for (V2−V1)/(T2−T1), the timing control unit 154 control the image capturing unit 160 so as to expose between T1 and T2, and when the calculated rate-of-change per unit time is for (V4−V3)/(T4−T3), the timing control unit 154 control the image capturing unit 160 so as to expose between T3 and T4.

Moreover, if the speed of the vehicle at the time of capturing the plurality of continuous frames is constant when the image capturing unit 160 captures the dynamic image, the rate-of-change of the capturing magnification at the time of capturing of those frames will be constant. Therefore, when the speed of the vehicle is constant, the capturing magnification control unit 152 may control the timing of capturing the image for the image capturing unit 160 by a constant phase. For example, the capturing timing control unit 154 allows to capture the image for a frame between T1 and T2, and to capture the following image between T1' and T2', which has the same phase.

According to the image capturing apparatus 10 of the present embodiment, when capturing images periodically such as a dynamic image, the capturing magnification is changed periodically. Thereby, when the speed of the vehicle is constant, a clear image without blurring can be captured constantly and highly accurately only by controlling capturing timing by the phase decided based on the rate-of-change calculated by the capturing magnification rate-of-change calculating unit 140.

On the other hand, even if it is necessary to change the rate-of-change of the capturing magnification when the speed of the vehicle changes, for example, since the image without blurring can be captured only by changing the phase which controls capturing timing without changing periodic change of the capturing magnification, blurring can be compensated more quickly compared with changing operation of controlling mechanism, such as an actuator, whenever it is necessary to change the rate-of-change of capturing magnification, and the convenience for the driver improves.

Moreover, since the image can be captured using the capturing magnification of various rate-of-change only by fluctuating the capturing magnification by a constant cycle and changing the phase which controls the capturing timing, load on the controlling mechanism, such as an actuator, can be lessened compared with a case where the capturing magnification, which is constant when it does not capture the image, has to be changed to a predetermined rate-of-change whenever it is needed, and consumption of the controlling mechanism, unexpected malfunctioning, etc. can be reduced.

Figure 4:
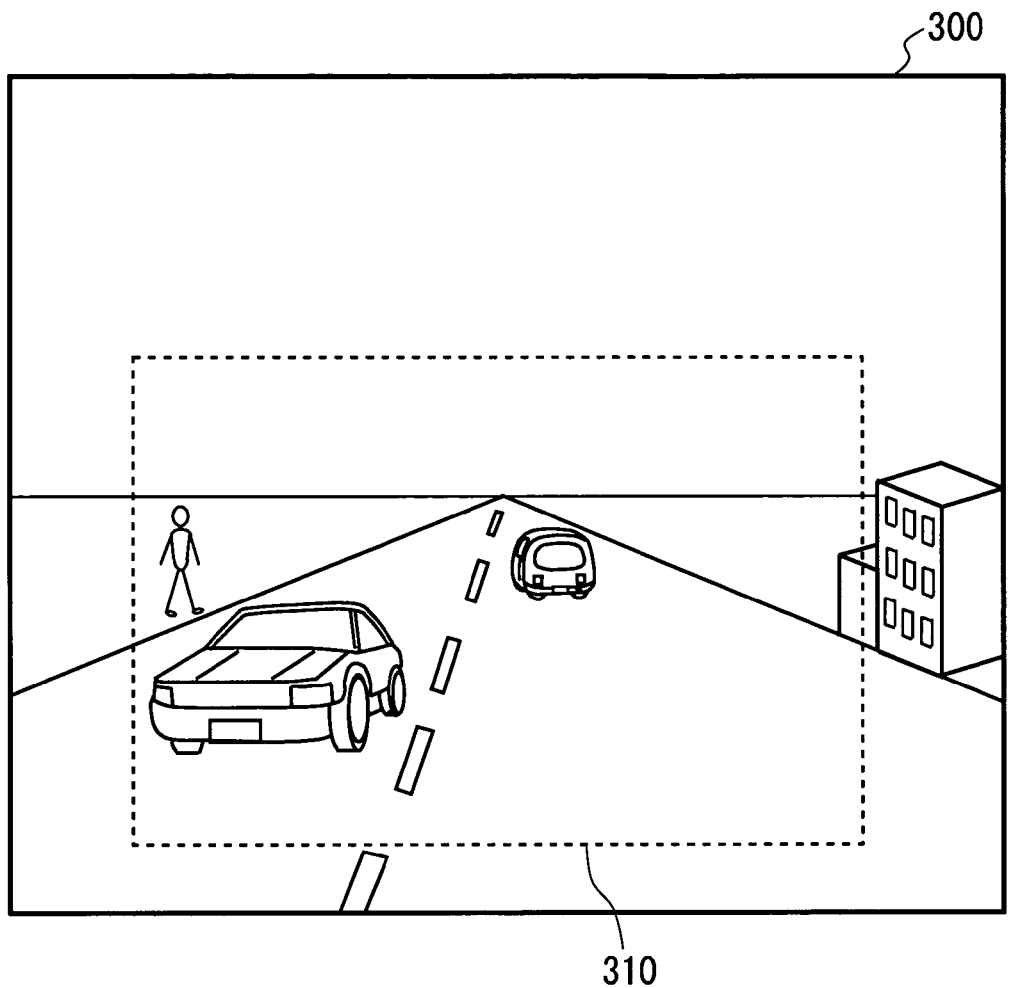
FIG. 4 is a drawing exemplary showing an optical image focused by an optical system according to the first embodiment of the present invention.

FIG. 4 shows an example of the optical image 300 focused by the optical system 162 according to the first embodiment of the present invention. For example, when the image capturing apparatus 10 is provided to capture an image of front of the vehicle, and when the vehicle travels ahead, the image of a stationary subject will move radially from center to periphery centering on the vanishing point. Such a movement of the subject image during the exposure time results the blurring in the captured image. Moreover, when decreasing the capturing magnification during the exposure time, the subject image moves radially toward the center from the periphery centering on the optical center. According to the image capturing apparatus 10 of the present embodiment, an image without blurring can be captured by negating the movement of the subject image caused by the above-mentioned movements of the vehicle by the movement of the subject image by changing the capturing magnification. On the other hand, when the vehicle travels back, the image capturing apparatus 10 can capture an image without blurring by increasing the capturing magnification.

Here, in order to capture an image without blurring highly accurately in any case, it is preferable that the vanishing point is aligned with the optical center. That is, in the image capturing apparatus 10 according to the present embodiment, like the optical image 300 shown in the drawing, it is preferable that the direction of the optical axis of the image capturing unit 160 is controlled so that the vanishing point may be located at the center of the optical image 300. Here, when the image captured by the image capturing apparatus 10 is used for the recognition of environment around the vehicle, upper part of the optical image 300, which is occupied by the image of sky, is unnecessary in many cases. Then, the CCD 164 according to the present embodiment is provided so that the central region of the image to be captured may be located below the optical axis of the optical system 162. For example, as shown in the drawing, the CCD 164 captures the region 310, which is downwardly biased in the optical image 300 of the subject focused by the optical system 162. Thus, the limited pixels of the CCD 164 can be effectively utilized by capturing only for the region where importance is higher than the other area of the focused optical image.

Figure 5:
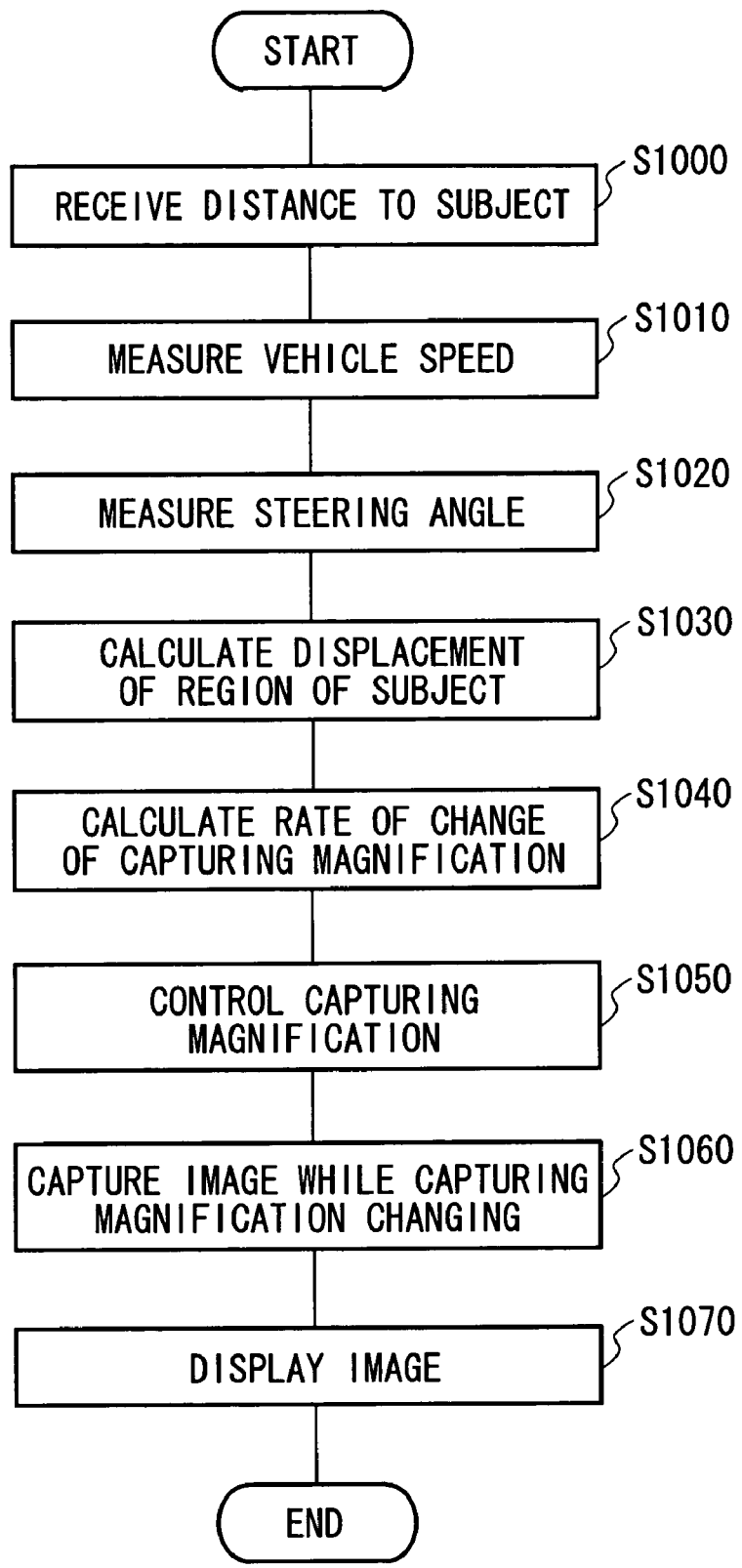
FIG. 5 is a flow chart exemplary showing processing flow of the image capturing apparatus according to the first embodiment of the present invention.

FIG. 5 is a flow chart exemplary showing processing flow of the image capturing apparatus 10 according to the first embodiment of the present invention. First, the distance receiving unit 100 receives the distance from the vehicle to the subject which exists in the angle-of-view of the image capturing unit 160 by using, for example, a focusing sensor, a range finder, etc. (S1000). Here, the distance receiving unit 100 receives distance from the vehicle to the subject for a subject which exists in a predetermined direction among a plurality of subjects which exist in the angle-of-view of the image capturing unit 160. Then the received distance may be output to the displacement calculating unit 130. Alternatively, among a plurality of subjects which exist in the angle-of-view of the image capturing unit 160, the distance receiving unit 100 calculates the weight for every subject based on a predetermined weight for every centroid position of the region indicating the subjects within the image, and based on a predetermined weight defined for every distance from the vehicle to the subject. Then, the information indicating the distance from the vehicle to the subject and the position of the subject in the angle-of-view may be output to the displacement calculating unit 130. Thereby, even if there are a plurality of subjects, the image capturing apparatus 10 can capture a clear image without blurring for the subjects which should be noticed the most. Moreover, the information indicating the position of the subject in the angle-of-view may be a vector which indicates the direction from the optical center of the optical system 162 to the subject in a predetermined system of coordinates.

Then, the speed measurement unit 110 measures the speed of the vehicle based on the number of revolutions of the engine or the like (S1010) Then, the steering angle measurement unit 120 measures the steering angle of the vehicle based on the rotation angle of the steering or the like (S1020). Then, the displacement calculating unit 130 calculates the displacement of the region indicating the subject in the image captured by the image capturing unit 160 during the exposure time based on the distance, the speed of the vehicle, and the steering angle of the vehicle for the subject of which the distance from the vehicle is received by the distance receiving unit 100 (S1030). Here, even if the vehicle is not going straight on, by calculating the displacement further based on not only the distance to the subject and the speed of the vehicle but also on the steering angle of the vehicle, an image of the subject without blurring due to the movement of the vehicle can be captured.

Then, the capturing magnification rate-of-change calculating unit 140 compensates the displacement based on the displacement of the region indicating the calculated subject, and calculates the rate-of-change of the capturing magnification so that the position of the region indicating the subject during the exposure time may be substantially constant (S1040). Then, the capturing magnification control unit 152 controls the capturing magnification of the image capturing unit 160 in order to change it by the calculated rate-of-change (S1050). Then, the capturing timing control unit 154 makes the image capturing unit 160 capture the image while the capturing magnification of the image capturing unit 160 changing by the calculated rate-of-change (S1060). Then, the displaying unit 190 displays the captured image and provides the driver or the like with it (S1070).

In addition, as for the image capturing apparatus 10 according to the present embodiment, while capturing a plurality of images, the plurality of images may be compounded and users, such as an operator, may be provided with the compound image. Hereinafter, composing processing of the plurality of images captured by the image capturing apparatus 10 will be described.

In this case, the displacement calculating unit 130 calculates the displacement of the region indicating the subject which exists in the angle-of-view of the image capturing unit 160 in the image during the exposure time of the image capturing unit 160 for each of a plurality of images captured by the image capturing unit 160 based on the speed measured by the speed measurement unit 110. Then, the capturing magnification rate-of-change calculating unit 140 calculates the rate-of-change of the capturing magnification of the image capturing unit 160 which compensates the displacement calculated by the displacement calculating unit 130 in the image for each of the plurality of images captured by the image capturing unit 160. Then, the capturing magnification control unit 152 controls the capturing magnification of the image capturing unit 160 in order to change it by the rate-of-change calculated by the displacement calculating unit 130 in the image for each of the plurality of images captured by the image capturing unit 160. Then, the capturing timing control unit 154 makes the image capturing unit 160 capture the image while capturing magnification changing by the rate-of-change calculated by the displacement calculating unit 130 in the image for each of the plurality of images captured by the image capturing unit 160. The plurality of images without blurring can be captured using the image capturing unit 160 of the image capturing apparatus 10 for the subject which exists in the image as described above. Then, the image processing unit 180 composes a plurality of images captured by the image capturing unit 160, generates a new image, and makes the displaying unit 190 display the image.

For example, by performing well-known image processing called SR (Super Resolution) processing, the image processing unit 180 may compose a plurality of captured images, and may generate an image having higher resolution. Specifically, the image processing unit 180 may compose the plurality of images and generates an image having higher resolution by arranging the corresponding pixels in the plurality of image in the vicinity of each other.

Here, the displacement calculating unit 130 may calculate the displacement of the region indicating mutually different subjects for at least some images among the plurality of images captured by the image capturing unit 160. By this, since the image without blurring can be generated for each subject when there are a plurality of subjects in the image to be captured, the user such as a driver can be provided with a high quality image.

Moreover, in this case, the image processing unit 180 may compose each of the image of the region where the displacement was calculated by the displacement calculating unit 130 in each of a plurality of images captured by the image capturing unit 160, and may generate an image having higher resolution. For example, the image processing unit 180 may receive the information on a region indicating the subject, of which the displacement is compensated by the rate-of-change of capturing magnification when the image is captured, from the displacement calculating unit 130 for each of the plurality of images, and may compose each of the images of the region based on the received information. Moreover, the image processing unit 180 may extracts the subject in the image by performing edge extraction processing for each of the plurality of images and detect the subject, which has larger difference between light and shade of the edge than the other subjects, as a subject without blurring, and may compose each of the image indicating the subject. Thereby, since only an image without blurring can be selected and an image can be composed for each subject when a plurality of subjects are contained in the image to be captured, the user can be provided with a high quality image.

Moreover, as for each of the plurality of captured images, when two other images, which are captured before and after the capturing of the image for every region which are partitioned from the two images among the image and a plurality of images, and when the difference in each image in the region is less than a predetermined reference value, the image processing unit 180 may compose the image of the region included in each image.

When composing a plurality of images using SR processing and generating a new image, when the images completely the same as one another are to be composed, the resolution of the composed image is the same as that of the original images. For this reason, it is preferable that the plurality of images are different from one another. However, when the difference in the plurality of images is great, the quality of a composite image will deteriorate on the contrary. In the image capturing apparatus 10 according to the present embodiment, when the plurality of images are to be captured and an image are to be composed, it is preferable that the plurality of images are captured within a short duration, e.g., less than 100 millisecond. However, even if it is the case where a plurality of images are being captured within a duration short enough, when the subject's movement is great, the difference in the images indicating the subject may become large. However, even if it is such a case, when the difference in the images in every partitioned region is less than a reference value, a high quality composite image can be generated by composing the images of the region.

As mentioned above the user can be provided with a high quality image by composing a plurality of captured images and generating an image with high resolution.

In addition, although the image capturing apparatus 10 is provided to the vehicle in the above description, the image capturing apparatus 10 may be provided to another movable body and may capture the image around the movable body. For example, the image capturing apparatus 10 may be provided in an endoscope. Thereby, when inspecting organ and organization in living body using the endoscope, even if it is the case where the endoscope is being moved, an image without blurring can be captured.

Figure 6:
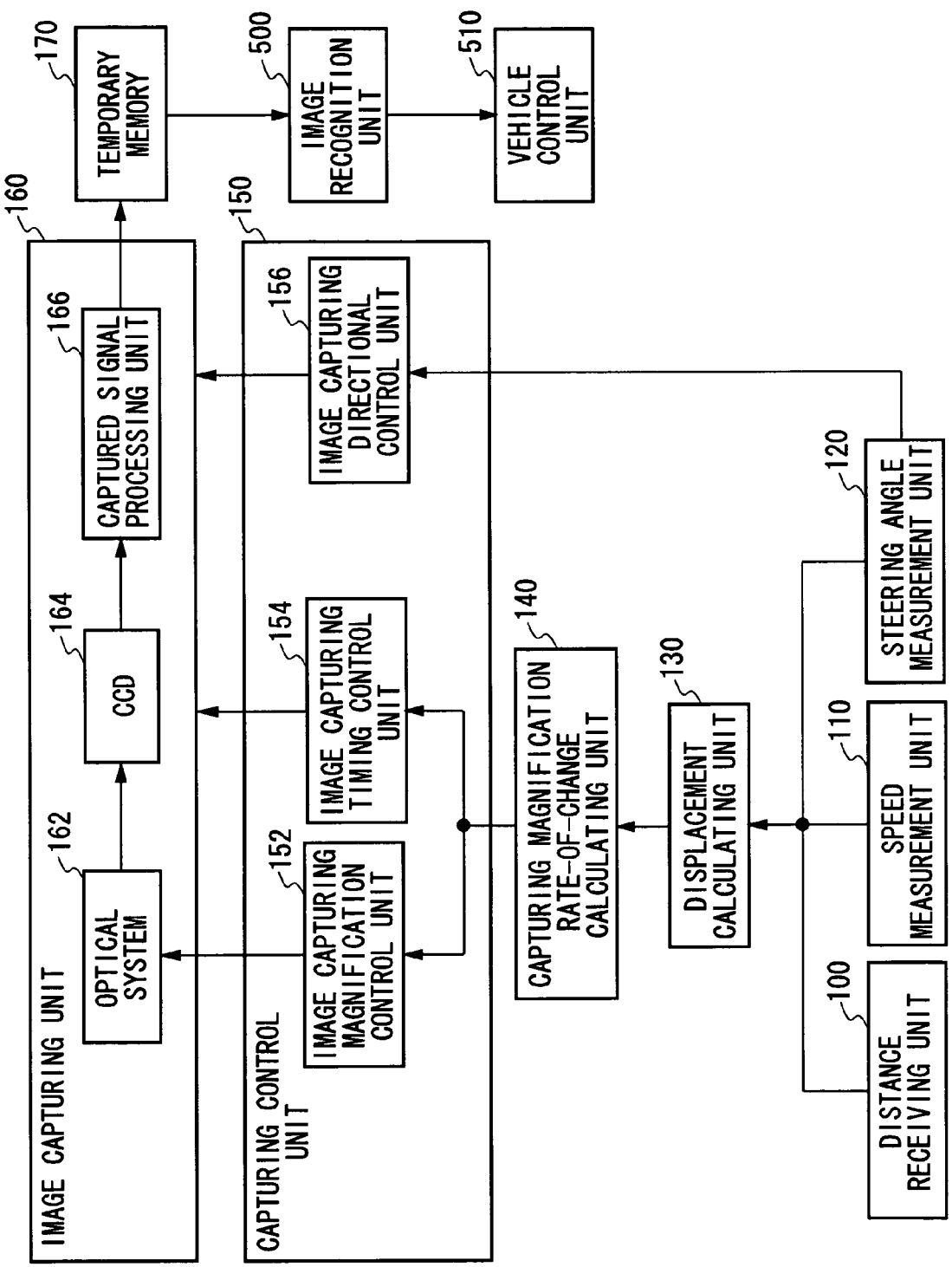
FIG. 6 is a block diagram exemplary showing a configuration of an image recognition system according to a second embodiment of the present invention.

FIG. 6 is a block diagram exemplary showing a configuration of the image recognition system 20 according to a second embodiment of the present invention. The image recognition system 20 is provided to a vehicle, such as a car, and captures the image around the vehicle and controls the vehicle based on the result of the image recognition to the captured image performed by the image recognition system 20. It is an object of the image recognition system 20 according to the present embodiment to control the vehicle with sufficient accuracy while performing image recognition with sufficient accuracy by capturing an image without blurring.

The image recognition system 20 includes a distance receiving unit 100, a speed measurement unit 110, a steering angle measurement unit 120, a displacement calculating unit 130, a capturing magnification rate-of-change calculating unit 140, a capturing control unit 150, an image capturing unit 160, a temporary memory 170, an image recognition unit 500, and a vehicle control unit 510. In addition, among the components of the image recognition system 20 shown in the drawing, the components which bear the same reference numeral of the image capturing apparatus 10 shown in FIG. 1 have substantially the same function and configuration as those explained with reference to FIGS. 1-5. Therefore, explanation of these components will be omitted except for their difference.

The image recognition unit 500 receives the image captured by the image capturing unit 160 under the control of the capturing timing control unit 154 through the temporary memory 170, and the subject in the received image is recognized using well-known image recognition technology. Then, the image recognition unit 500 outputs the recognition result of the subject included in the captured image to the vehicle control unit 510. Here, the recognition result may include information indicating position and size of the region indicating the subject in the image, distance from the subject to the vehicle, the direction to the subject seen from the vehicle, and type of the subject. The vehicle control unit 510 controls the speed and the steering angle of the vehicle based on the subject in the image which has been captured by the image capturing unit 160 and recognized by the image recognition unit 500.

According to the image recognition system 20 of the present embodiment, even if it is the case where the position of the region, which indicates the subject in the image captured, is changed due to the travel of the vehicle during the exposure time, by changing the capturing magnification to compensate the change of the position of the region indicating the subject, the clear image without blurring in the image of the subject can be captured. Therefore, the subject in the captured image can be recognized with sufficient accuracy. Then, according to the image recognition system 20, by using the image recognition result for the image without blurring, when performing the automatic operation etc., the vehicle can be controlled highly accurately.

Figure 7:
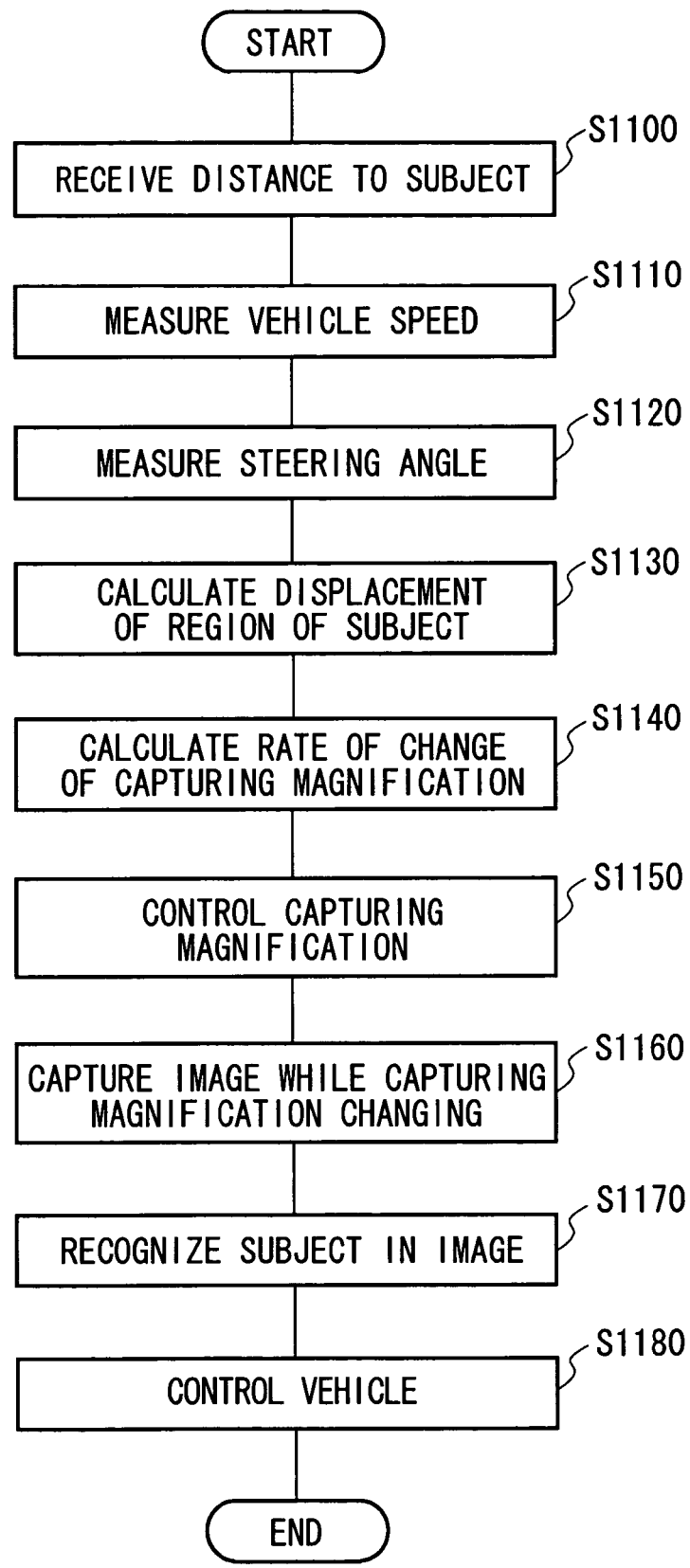
FIG. 7 is a flow chart exemplary showing processing flow of the image recognition system according to the second embodiment of the present invention.

FIG. 7 is a flow chart exemplary showing processing flow of the image recognition system 20 according to the second embodiment of the present invention. First, the distance receiving unit 100 receives the distance from the vehicle to the subject which exists in the angle-of-view of the image capturing unit 160 (S1100). Then, the speed measurement unit 110 measures the speed of the vehicle (S1110). Then, the steering angle measurement unit 120 measures the steering angle of the vehicle (S1120). Then, the displacement calculating unit 130 calculates the displacement of the region indicating the subject in the image captured by the image capturing unit 160 during the exposure time based on the distance, the speed of the vehicle, and the steering angle of the vehicle for the subject of which the distance from the vehicle has been received by the distance receiving unit 100 (S1130).

Then, the capturing magnification rate-of-change calculating unit 140 compensates the displacement based on the displacement of the region indicating the calculated subject, and calculates the rate-of-change of the capturing magnification at which the position of the region indicating the subject during the exposure time becomes substantially constant (S1140). Then, the capturing magnification control unit 152 controls the capturing magnification of the image capturing unit 160 in order to change it by the calculated rate-of-change (S1150). Then, the capturing timing control unit 154 makes the image capturing unit 160 capture the image while the capturing magnification of the image capturing unit 160 changing by the calculated rate-of-change (S1160).

Then, the image recognition unit 500 recognizes the subject in the image captured by the image capturing unit 160 (S1170). For example, the image recognition unit 500 may extract the image indicating the subject included in the captured image by performing edge extraction processing to the captured image. Then, the image recognition unit 500 may detect the type of the subject by comparing the extracted image indicating the subject with pattern data which are predetermined for each kind of the subject.

Then, the vehicle control unit 510 controls the speed and the steering angle of the vehicle based on the subject in the image which has been recognized by the image recognition unit 500 and captured by the image capturing unit 160 (S1180). For example, when the vehicle equipped with the image recognition system 20 is to be operated automatically, and when existence of a person is recognized in the traveling direction by the image recognition unit 500, the vehicle control unit 510 may change the traveling direction of the vehicle so that it may not hit the person while reducing the speed of the vehicle.

In addition, although the image recognition system 20 is provided to the vehicle in the above description, the image recognition system 20 may be provided to another movable body and capture the image of the movable body.

Figure 8:
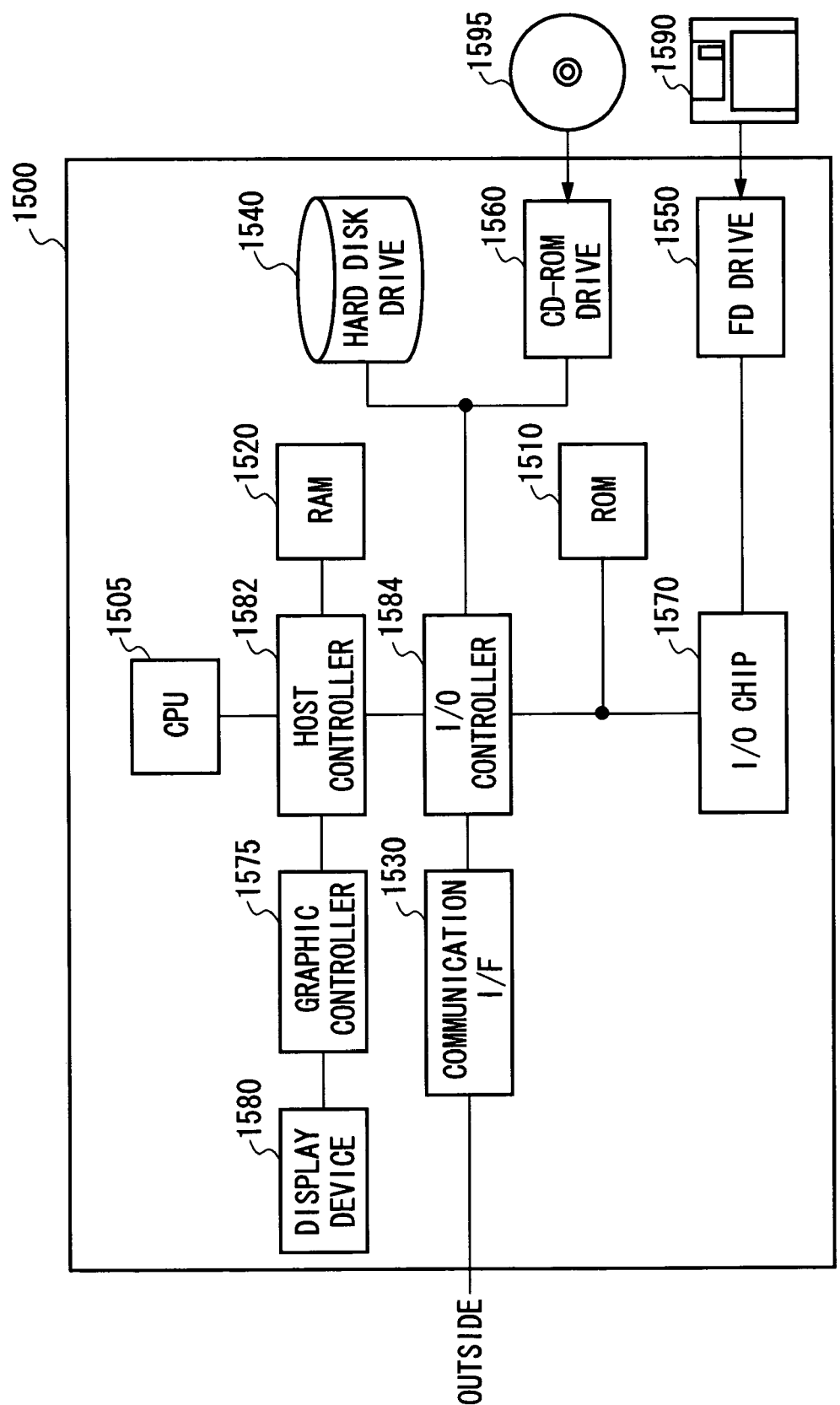
FIG. 8 is a block diagram exemplary showing a hardware configuration of a computer according to embodiments of the present invention.

FIG. 8 is a block diagram exemplary showing a hardware configuration of a computer 1500 according to the present invention. The computer 1500 according to the present invention includes a CPU control unit including CPU 1505, RAM 1520, a graphic controller 1575 and a display device 1580 which are connected mutually by a host controller 1582, an I/O unit including communication interface connected to the host controller 1582 by the an I/O controller 1584, a hard disk drive 1540 and a CD-ROM drive 1560, a legacy I/O unit including ROM 1510 connected to the I/O controller 1584, a FD drive 1550 and an I/O chip 1570.

The host controller 1582 connects the RAM 1520 to the CPU 1505 accessing the RAM 1520 at the high transmission rate and the graphic controller 1575. The CPU 1505 operates on a basis of the programs stored on the ROM 1510 and the RAM 1520 and controls each unit. The graphic controller 1575 obtains the image data generated by the CPU 1505 on the frame buffer formed in the RAM 1520 and makes the display device 1580 execute display. Instead, the graphic controller 1575 may include the frame buffer storing the image data generated by the CPU 1505.

The I/O controller 1584 connects the host controller 1582 to the hard disk drive 1540, the communication interface 1530 and the CD ROM drive 1560, which are I/O devices at relatively high speed. The hard disk drive 1540 stores programs or data used by the CPU 1505 in the computer 1500. The communication interface 1530 communicates with the image capturing apparatus 10 through the network, and provides the image capturing apparatus 10 with the program and data. The CD-ROM drive 1560 reads programs or data from the CD-ROM 1595 and provides them for the hard disk drive 1540 and the communication interface 1530 via the RAM 1520.

Moreover, the ROM 1510, the F/D drive 1550 and the relatively low-speed I/O device of the I/O chip 1570 in the I/O controller 1584. The ROM 1510 stores a boot program executed by the computer 1500 on starting or programs depending on the hardware of the computer 1500. The FD drive 1550 reads programs or data from the FD 1590 and provides them for the hard disk drive 1540 and the communication interface 1530 via the RAM 1520. The I/O chip 1570 connects various kinds of the I/O device via the FD drive 1550 or such as, a parallel port, a serial port, a keyboard, and a mouse port.

The capturing program provided to the communication interface 1530 through the RAM 1520 is stored on a record medium, such as a flexible disk 1590, a CD-ROM 1595, or an integrated circuit card, which is provided by the user. The capturing program is read from the record medium, and the communication interface 1530 is provided with it through the RAM 1520, and it is transmitted to the image capturing apparatus 10 through the network. The capturing program transmitted to the image capturing apparatus 10 is installed to and performed by the image capturing apparatus 10. The capturing program which is installed to and performed by the image capturing apparatus 10 causes the image capturing apparatus 10 to act as the image capturing apparatus 10 described with reference to FIGS. 1-5.

The image recognition program provided for the hard disk drive 1540 via the RAM 1520 are stored on a recording medium such as the FD 1590, the CD-ROM 1595 or an IC card and are provided for the user. The image recognition program are read from the recording medium, are installed on the hard disk drive 1540 in the computer 1500 via the RAM 1520 and are executed by the CPU 1505. The programs installed in the computer 1500 and executed operate on the CPU 1505 and make the computer 1500 perform functions as the image recognition system 120 explained with reference to FIG. 6 and FIG. 7.

The above-mentioned programs may be stored on an external recording medium. As a recording medium, an optical recording medium such as DVD, PD, a magneto optical recording medium such as MD, a tape medium, a semiconductor memory such as an IC card can be used in addition to the FD 1590, CD-ROM 1595. Moreover, a memory device, such as the hard disk installed in the sever system connected to the exclusive communication network or Internet, or RAM, may be used as the recording medium and the programs may be provided for the computer 1500 via the network.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An image capturing apparatus provided to a movable body, comprising:
    an image capturing unit which captures an image;
    a speed measurement unit which measures a speed of the movable body;
    a displacement calculating unit which calculates a displacement of a region indicating a subject which exists in an angle-of-view of said image capturing unit in an image captured by said image capturing unit based on the speed during an exposure time of said image capturing unit;
    a capturing magnification rate-of-change calculating unit which calculates a rate-of-change of a capturing magnification of said image capturing unit, wherein said capturing magnification rate-of-change calculating unit compensates the displacement;
    a capturing magnification control unit which controls the capturing magnification in order to change it by the rate-of-change; and
    a capturing timing control unit which makes said image capturing unit capture an image while the capturing magnification changing by the rate-of-change.

2. The image capturing apparatus as claimed in claim 1, further comprising a distance receiving unit which receives a distance from the movable body to the subject, wherein
said displacement calculating unit calculates a displacement of a region indicating the subject in an image captured by said image capturing unit during an exposure time of said image capturing unit further based on the distance.

3. The image capturing apparatus as claimed in claim 1, wherein
said capturing magnification control unit fluctuates the capturing magnification by a frequency of an integral multiple of a frame rate of a captured image, and
said capturing timing control unit makes said image capturing unit capture an image by a phase in which the capturing magnification fluctuates by the rate-of-change.

4. The image capturing apparatus as claimed in claim 1, wherein the movable body is a vehicle.

5. The image capturing apparatus as claimed in claim 4 further comprising a steering angle measurement unit which measures a steering angle of the vehicle, wherein
said displacement calculating unit calculates a displacement of a region indicating the subject in an image captured by said image capturing unit during an exposure time of said image capturing unit further based on the steering angle.

6. The image capturing apparatus as claimed in claim 4, further comprising:
a steering angle measurement unit which measures a steering angle of the vehicle; and
a capturing directional control unit which controls a capturing direction of said image capturing unit based on the steering angle so that a vanishing point in an image captured by said image capturing unit may be aligned with an optical center of said image capturing unit.

7. The image capturing apparatus as claimed in claim 1, wherein said image capturing unit comprises:
an optical system which focuses an optical image of the subject; and
a CCD in which a center of a region for capturing is provided so that it may be located below an optical axis of said optical system.

8. The image capturing apparatus as claimed in claim 1, wherein
said image capturing unit captures a plurality of images,
said displacement calculating unit calculates the displacement of a region indicating a subject which exists in an angle-of-view of said image capturing unit in the image during an exposure time of said image capturing unit for each of the plurality of images captured by said image capturing unit based on the measured speed,
said capturing magnification rate-of-change calculating unit calculates the rate-of-change of the capturing magnification of said image capturing unit, which compensates the calculated displacement in the image for each of the plurality of images captured by said image capturing unit,
said capturing magnification control unit controls the capturing magnification in order to change it by the rate-of-change calculated in the image for each of the plurality of images captured by said image capturing unit,
said capturing timing control unit makes said image capturing unit capture the image while the capturing magnification changing by the rate-of-change calculated in the image for each of the plurality of images captured by said image capturing unit, and
said image capturing apparatus comprises
an image processing unit which composes the plurality of images captured by said image capturing unit, and generates an image having higher resolution than the plurality of images captured by said image capturing unit.

9. The image capturing apparatus as claimed in claim 8, wherein said displacement calculating unit calculates the displacement of a region indicating subjects being different with each other for at least some images among the plurality of images captured by said image capturing unit.

10. The image capturing apparatus as claimed in claim 9, wherein said image processing unit composes each image of a region where displacement has been calculated by said displacement calculating unit in each of the plurality of images captured by said image capturing unit.

11. An image capturing method for an image capturing apparatus provided to a movable body, comprising:
an image capturing step of capturing an image by a capturing unit provided to the image capturing apparatus;
a speed measurement step of measuring a speed of the movable body;
a displacement calculating step of calculating a displacement of a region indicating a subject which exists in an angle-of-view of said image capturing unit in an image captured in said image capturing step based on the speed during an exposure time of said image capturing step;
a capturing magnification rate-of-change calculating step of calculating a rate-of-change of a capturing magnification in said image capturing step, wherein the displacement is compensated in said capturing magnification rate-of-change calculating step;
a capturing magnification control step of controlling the capturing magnification in order to change it by the rate-of-change; and
a capturing timing control step of making the image capturing unit capture an image while the capturing magnification changing by the rate-of-change.

12. A machine readable medium having an image capturing program stored thereon, which when executed by a machine causes an image capturing apparatus provided to a movable body to act as an image capturing apparatus, comprising:
an image capturing unit which captures an image;
a speed measurement unit which measures a speed of the movable body;
a displacement calculating unit which calculates a displacement of a region indicating a subject which exists in an angle-of-view of said image capturing unit in an image captured by said image capturing unit based on the speed during an exposure time of said image capturing unit;
a capturing magnification rate-of-change calculating unit which calculates a rate-of-change of a capturing magnification of said image capturing unit, wherein said capturing magnification rate-of-change calculating unit compensates the displacement;
a capturing magnification control unit which controls the capturing magnification in order to change it by the rate-of-change; and
a capturing timing control unit which makes said image capturing unit capture an image while the capturing magnification changing by the rate-of-change.

13. An image recognition system, comprising:
an image capturing unit which captures an image;
a speed measurement unit which measures a speed of the movable body;

a displacement calculating unit which calculates a displacement of a region indicating a subject which exists in an angle-of-view of said image capturing unit in an image captured by said image capturing unit based on the speed during an exposure time of said image capturing unit;

a capturing magnification rate-of-change calculating unit which calculates a rate-of-change of a capturing magnification of said image capturing unit, wherein said capturing magnification rate-of-change calculating unit compensates the displacement;

a capturing magnification control unit which controls the capturing magnification in order to change it by the rate-of-change;

a capturing timing control unit which makes said image capturing unit capture an image while the capturing magnification changing by the rate-of-change; and an image recognition unit which recognizes the subject in the image, which is captured by said image capturing unit under control of said capturing timing control unit.

14. The image recognition system as claimed in claim 13, wherein the movable body is a vehicle, and the image recognition system further comprises a vehicle control unit which controls a speed and a steering angle of the vehicle based on the subject recognized by said image recognition unit.

15. An image recognition method, comprising:

an image capturing step of capturing an image by a capturing unit provided to the image capturing apparatus;

a speed measurement step of measuring a speed of the movable body;

a displacement calculating step of calculating a displacement of a region indicating a subject which exists in an angle-of-view of said image capturing unit in an image captured in said image capturing step based on the speed during an exposure time of said image capturing step;

a capturing magnification rate-of-change calculating step of calculating a rate-of-change of a capturing magnification in said image capturing step, wherein the displacement is compensated in said capturing magnification rate-of-change calculating step;

a capturing magnification control step of controlling the capturing magnification in order to change it by the rate-of-change;

a capturing timing control step of making the image capturing unit capture an image while the capturing magnification changing by the rate-of-change; and an image recognition step of recognizing the subject in the image captured by the image capturing unit under control of said capturing timing control step.

16. A machine readable medium having an image recognition program stored thereon, which when executed by a machine causes a machine to act as an image recognition system, comprising:

an image capturing unit which captures an image;

a speed measurement unit which measures a speed of the movable body;

a displacement calculating unit which calculates a displacement of a region indicating a subject which exists in an angle-of-view of said image capturing unit in an image captured by said image capturing unit based on the speed during an exposure time of said image capturing unit;

a capturing magnification rate-of-change calculating unit which calculates a rate-of-change of a capturing magnification of said image capturing unit, wherein said capturing magnification rate-of-change calculating unit compensates the displacement;

a capturing magnification control unit which controls the capturing magnification in order to change it by the rate-of-change;

a capturing timing control unit which makes said image capturing unit capture an image while the capturing magnification changing by the rate-of-change; and an image recognition unit which recognizes the subject in the image, which is captured by said image capturing unit under control of said capturing timing control unit.

* * * * *